United States Patent [19]

Ishii

[11] Patent Number: 4,995,754
[45] Date of Patent: Feb. 26, 1991

[54] BALL-AND-SOCKET JOINT

[75] Inventor: Shoju Ishii, Hamamatsu, Japan

[73] Assignee: Rhythm Motor Parts Mfg., Co., Ltd., Shizuoka, Japan

[21] Appl. No.: 347,041

[22] Filed: May 4, 1989

[30] Foreign Application Priority Data

Jun. 6, 1988 [JP] Japan ............................ 63-75568[U]

[51] Int. Cl.⁵ .......................................... F16C 11/06
[52] U.S. Cl. .................................. 403/132; 403/133; 403/138
[58] Field of Search ............... 403/132, 133, 138, 122, 403/76, 134–136, 144; 29/149.5 B

[56] References Cited

U.S. PATENT DOCUMENTS

| 4,256,413 | 3/1981 | Abe ................................. 403/122 X |
| 4,259,027 | 3/1981 | Hata ................................. 403/132 |
| 4,626,121 | 12/1986 | Tajima et al. ................... 403/132 X |

FOREIGN PATENT DOCUMENTS

| 1953116 | 6/1971 | Fed. Rep. of Germany ...... 403/132 |
| 5234167 | 10/1975 | Japan .................................... 403/132 |
| 1057833 | 5/1959 | Netherlands ........................ 403/132 |
| 1455668 | 11/1976 | United Kingdom ............... 403/132 |

Primary Examiner—Andrew V. Kundrat
Assistant Examiner—Franco S. DeLiguori
Attorney, Agent, or Firm—Lane, Aitken & McCann

[57] ABSTRACT

A ball-and-socket joint comprising: a housing having an open end at its upper end, the upper end having an inner peripheral surface which inclines upward and radially inward; a bearing element disposed in the housing; a ball stud having a ball end retained in the bearing element and a shank portion extending from the ball end freely through the open end of the housing; an end cover plate secured in a lower end of the housing; and a resiliently yieldable member compressed between the bearing element and the end cover plate for urging the bearing element against the ball end of the ball stud. The inner peripheral surface of the housing is locally hardened by a high frequency hardening.

1 Claim, 1 Drawing Sheet

BALL-AND-SOCKET JOINT

FIELD OF THE INVENTION

The present invention relates to a ball-and-socket joint especially useful in steering linkages for vehicles, and in particular to such a joint which has a socket and a ball stud having a ball end received in the socket and a shank portion extending from the ball end freely through the upper open end of the socket.

DESCRIPTION OF THE PRIOR ART

A conventional ball-and-socket joint is shown for example in FIG. 2.

In FIG. 2, 1 is a metallic ball stud having a shank portion 1a and a ball end 1b at the lower end of the shank portion 1a, the ball end 1b being retained in a sheet bearing 2 of hard plastics material having an inner spherical bearing surface.

3 is a hollow cylindrical housing or socket of metallic material, the inside diameter of which is larger than an outside diameter of the ball end 1b of the ball stud 1. The cylindrical housing 3 has at its upper end an open end 3a, the inside diameter of which is smaller than the outside diameter of the ball end 1b.

In the fabrication of the ball-and-joint socket, the sheet bearing 2 having the ball end 1b retained therein is press fitted into the housing 3, and the shank portion 1a extends freely through the upper open end 3a of the housing 3.

A circular-shaped end cover plate 4 is then secured in the lower end of the housing 3 by bending the lower end radially inward, so that a lower surface 2a of the sheet bearing 2 is urged toward the ball end 1b at a predetermined pressure by the cover plate 4.

However, the above conventional ball-and-socket joint has disadvantages in that if the outer peripheral surface of the ball end 1b contacts the inner peripheral surface of the upper open end 3a of the housing 3 due to abrasion of the sheet bearing 2, this inner peripheral surface tends to abrade.

If the inner peripheral surface of the upper open end 3a of the housing 3 abrades, play of the ball end 1b within the housing 3 will be rapidly increased, so that operating torque of the ball stud 1 becomes unstable suddenly, and in the extreme case the ball end 1b is disengaged from the housing 3.

Accordingly, it is an object of the present invention to provide a novel ball-and-socket joint which can overcome the drawbacks as produced by the conventional ball-and-socket joint, by preventing the abrasion of the open end of the housing.

SUMMARY OF THE INVENTION

In accordance with one important aspect of the present invention, there is provided a ball-and-socket joint comprising: a housing having an open end at its upper end, the upper end having an inner peripheral surface which inclines upward and radially inward; a bearing element disposed in the housing; a ball stud having a ball end retained in the bearing element and a shank portion extending from the ball end freely through the open end of the housing; an end cover plate secured in a lower end of the housing; and a resiliently yieldable member compressed between the bearing element and the end cover plate for urging the bearing element against the ball end of the ball stud.

The inner peripheral surface of the open end of the housing may be hardened by a high frequency hardening so as to have a predetermined hardness. The open end of the housing may also be hardened by a high frequency hardening so as to have a predetermined hardness.

The bearing element may have an upper end movable radially inward along the inner peripheral surface of the open end by the resiliently yieldable member.

The bearing element may be formed at its upper end with a plurality of slits.

The bearing element may have a bottom wall and a side wall extending from the bottom wall and smaller in thickness than the bottom wall.

The resiliently yieldable member may be formed from rubber or plastics material.

The inner peripheral surface of the open end of the housing may be formed into a frustoconical shape.

BRIEF DESCRIPTION OF THE DRAWINGS

The drawbacks of a conventional ball-and-socket joint and the features and advantages of a ball-and-socket joint according to the present invention will be more clearly understood from the following description taken in conjunction with the accompanying drawings.

DESCRIPTION OF THE PREFERRED EMBODIMENTS

Figure 1:
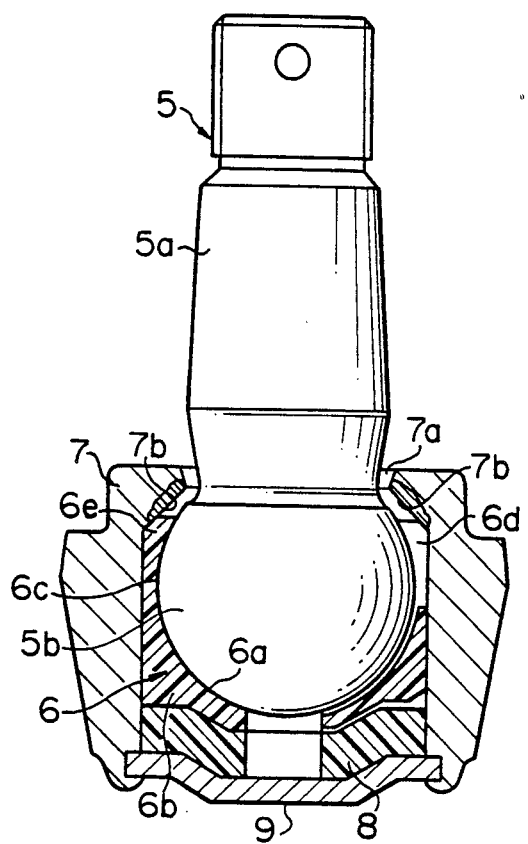
FIG. 1 is a cross-sectional view showing a ball-and-socket joint according to the present invention.
Figure 2:
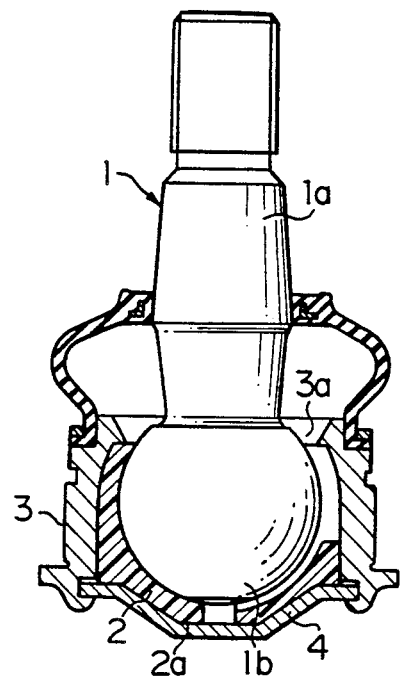
FIG. 2 is a cross-sectional view showing a conventional ball-and-socket joint.

Referring to FIG. 1, there is shown a preferred embodiment of a ball-and-socket joint in accordance with the present invention. The ball-and-socket joint comprises a housing or socket 7, a ball stud 5, a bearing element 6 of hard plastics material having an inner spherical bearing surface 6a, a resiliently yieldable member 8, and an end cover plate 9.

The housing or socket 7 is formed from metallic material, and has an open end 7a at its upper end. The upper open end 7a has an inner peripheral surface 7b, which is chamfered and inclines upward and radially inward. The inner peripheral surface 7b of the open end 7a is further locally hardened by a high frequency hardening so as to have a predetermined hardness.

The ball stud 5 is formed from metallic material and has a ball end 5b retained in the inner spherical bearing surface 6a of the bearing element 6, and a shank portion 5a extending from the ball end 5b freely through the upper open end 7a of the housing 7.

The bearing element 6 is disposed in the housing 7 and has a bottom wall 6b and a side wall 6c extending upward from the bottom wall 6b. The bottom wall 6b is larger in thickness than the side wall 6c, the side wall 6c being formed at its upper end with a plurality of vertically extending slits 6d by which the upper end is divided in the circumferential direction thereof.

The end cover plate 9 is secured in the lower end of the housing 7.

The resiliently yieldable member 8 is compressed between the bearing element 6 and the end cover plate 9 for urging said bearing element 6 against the ball end 5b of the ball stud 5. The resiliently yieldable member 8 is of circular form and formed from rubber or plastics material which is more soft and resilient than the bearing element 6.

In the fabrication of the ball-and-socket joint of the present invention, the bearing element 6 has the ball end 5b of the ball stud 5 received in the inner bearing surface 6a and is press fitted into the housing 7. The resiliently yieldable member 8 is then fitted in the lower portion of the housing 7 until the member 8 is brought into engagement with the bearing element 6. Furthermore, the resiliently yieldable member 8 is pressurized upward at a predetermined pressure by the end cover 9 which is secured in the lower end of the housing 7.

According to the above embodiment, when the inner peripheral bearing surface 6a of the bearing element 6 abrades due to rotary or other movement of the ball stud 5, the bearing element 6 is caused to move upward by repelling force of the resiliently yieldable member 8 until the space due to the above abrasion between the ball end 5b and the bearing element 6 is absorbed.

Since the inner peripheral surface 7b of the upper open end 7a of the housing 7 is inclined upward and radially inward, an upper end 6e of the bearing element 6 is guided radially inward along the inner peripheral surface 7b of the upper open end 7a by upper movement of the bearing element 6, so that the bearing element 6 firmly contacts the outer peripheral surface of the upper end of the ball end 5b. For this reason, a space is prevented from occurring between the ball end 5b and the inner peripheral bearing surface 6a of the bearing element 6, and thus the operating torque of the ball stud 5 becomes stable.

In addition, as the bottom wall 6b of the bearing element 6 is thick, the life to the above abrasion is increased and the bottom wall 6b retains a predetermined flexural rigidity and receives evenly the repelling force of the resiliently yieldable member 8. Consequently, the correcting function to the above abrasion is smoothly performed.

In the case that the bearing element 6 is abraded more than a predetermined value due to a long term use or use under excess loads and the outer peripheral surface of the ball end 5b thus contacts the inner peripheral surface 7b of the open end 7a of the housing 7, the diameter of the open end 7a is prevented from being increased, as the inner peripheral surface 7a is hardened by the high-frequency hardening and thus difficult to abrade. Accordingly, the play of the ball end 5 within the housing 7 does not increase rapidly, and the ball end 5b is effectively prevented from being disengaged from the housing 7. While it has been described that the inner peripheral surface 7b of the open end 7a is hardened by the high-frequency hardening, it is noted that the entire surface of the open end 7a may also be hardened.

As will be understood from the foregoing description, the present invention can provide a ball-and-socket joint wherein the operating torque of the ball stud is maintained stable over a long term, by preventing the abrasion of the open end of the housing.

While the subject invention has been described with relation to the preferred embodiment thereof, various modifications and adaptations thereof will now be apparent to those skilled in the art.

What I claim is:

1. A ball-and socket joint comprising:
   a housing having an open end at its upper end, the upper end having an inner peripheral surface which is chambered and inclines upward and radially inward;
   a bearing element disposed in said housing;
   a ball stud having a ball end retained in said bearing element and a shank portion extending from said ball end freely through said open end of said housing;
   an end cover plate secured in a lower end of said housing; and
   a resiliently yieldable member compressed between said bearing element and said end cover plate for urging said bearing element against said ball end of said ball stud;
   said inner peripheral surface of said open end of said housing being locally hardened by a high frequency hardening so as to have a predetermined hardness to prevent abrasion of said open end of said housing.

* * * * *